United States Patent [19]
Hirao et al.

[11] Patent Number: 5,171,489
[45] Date of Patent: Dec. 15, 1992

[54] METHOD OF PRODUCING COMPOSITE STAPLE FIBERS CONSISTING OF RESIN MATRIX AND FINE INORGANIC FIBERS

[75] Inventors: Yohsuke Hirao; Hirokazu Yamada; Ryosuke Kamei, all of Oita, Japan

[73] Assignee: Showa Denko K.K., Tokyo, Japan

[21] Appl. No.: 311,784

[22] Filed: Feb. 17, 1989

[30] Foreign Application Priority Data

Feb. 17, 1988 [JP] Japan .................... 63-32750

[51] Int. Cl.$^5$ .................................. B29B 9/00
[52] U.S. Cl. .......................... 264/8; 264/12; 264/14; 264/142
[58] Field of Search ............ 264/8, 12, 14, 104, 264/105, 138, 141, 142, 143, 174; 428/367, 373, 374

[56] References Cited

U.S. PATENT DOCUMENTS

| | | | |
|---|---|---|---|
| 3,419,517 | 12/1968 | Hendrick et al. | 260/37 |
| 3,461,197 | 8/1969 | Lemelson | 264/172 |
| 3,819,345 | 6/1974 | Battigelli | 264/8 X |
| 4,442,254 | 4/1984 | Aratani | 524/413 |

FOREIGN PATENT DOCUMENTS

180615 10/1983 Japan .
188464 9/1985 Japan .

OTHER PUBLICATIONS

Van A. Wente, "Superfine Thermoplastic Fibers", (1956).

*Primary Examiner*—James Lowe
*Assistant Examiner*—Christopher A. Fiorilla
*Attorney, Agent, or Firm*—Sughrue, Mion, Zinn, Macpeak & Seas

[57] ABSTRACT

A method for producing composite staple fibers whereby resin matrix and fine and short inorganic reinforcing fibers (e.g., vapor growth carbon fibers and/or potassium titanate whiskers) are processed. A resin material and fine and short inorganic reinforcing fibers having a fiber diameter of 1 μm or less are blended, heated, and mixed to prepare a molten polymer containing dispersed reinforcing fibers. The molten polymer is spouted out of small apertures in a high speed rotator to form filaments. Hot gas is blown onto the spouted filaments to form composite staple fibers. Instead of using the spouting step and the hot gas blowing step, one can spin the molten polymer from spinning apertures into filaments, and simultaneously blow hot gas onto the filaments at a high flow velocity from gas discharging holes arranged near the spinning apertures to draw and cut the filaments into the staple fibers.

7 Claims, 1 Drawing Sheet

METHOD OF PRODUCING COMPOSITE STAPLE FIBERS CONSISTING OF RESIN MATRIX AND FINE INORGANIC FIBERS

BACKGROUND OF THE INVENTION

1. Field of the Invention

The present invention relates to composite fibers, and more particularly to a method of producing composite staple organic fibers reinforced with fine and short inorganic fibers.

According to the present invention, the composite staple fibers have superior properties, such as strength, rigidity, electrical conductivity, thermal conductivity, frictional characteristics, and wear resistance of the fine and short inorganic reinforcing fibers, are utilized for unwoven fabric or felt through processing steps, and are added to and mixed in a resin (plastic), cement or the like, to improve the strength, rigidity, and electrical conductivity thereof.

2. Description of the Related Art

Fibers or composite fibers are hereinafter discussed from the viewpoint of, for example, the strength and electrical conductivity of the fibers. Carbon fibers made from raw fibers, such as PAN fibers and pitch fibers are well-known as electric conductive fibers, and have a high electrical conductivity, i.e., a specific resistance ($\rho$) of 1500 to 2000 $\mu\Omega cm$. Since the conductivity increased in accordance with the level of graphitization of the carbon fiber, a specific resistance ($\rho$) of 800 to 1000 $\mu\Omega cm$ can be attained. Furthermore, since the carbon fibers have a high strength and a high elastic modulus, they are widely used as a reinforcing material for, e.g., sports equipment such as golf clubs, fishing rods, and tennis rackets. The production process of the carbon fibers is complicated, and thus these fibers are very expensive.

Recently a method of cheaply and efficiently producing carbon fibers by a vapor phase growth process was developed. The carbon fibers produced by vapor phase growth (hereinafter called VGCF's) have superior mechanical properties, such as strength and elastic modulus, and a good electrical conductivity. The level of graphitization of the VGCF's can be increased to obtain a specific resistance ($\rho$) of 100 $\mu\Omega cm$ or less and to improve the mechanical properties, but when the VGCF's are produced in a relatively short period, they have a diameter of less than 1 $\mu m$ and a short length. If the diameter and length of the VGCF's are to be made thicker and longer, a long growth period is necessary, which raises the production cost.

It is well-known that an electrically conductive powder (filler) such as metal powder and carbon black is mixed with an organic material (synthetic resin) to make the organic material conductive and then the organic material is spun into composite fibers but the mechanical properties of the obtained fibers are inferior to those of the organic material without the filler. To obtain a practical electrical conductivity of the fibers, the mixture must contain a large amount of the filler, and as a result, the mechanical properties of the obtained fibers are reduced. If the carbon fibers made from PAN fibers or pitch are mixed into the organic material (resin) and then the organic material is spun into composite (carbon-fiber-reinforced) fibers, i.e., CFRP's, since each of the carbon fibers has a diameter of 7 $\mu m$ or more, each of the composite fibers has a diameter of several tens of micrometers or more, and thus has a disadvantage of rigidity. A clad-core simultaneous drawing method used for obtaining very fine fibers can be applied to the formation of composite organic fibers reinforced with the carbon fibers made from PAN fibers or pitch. In this case, the carbon-fiber-reinforced fibers (core) are clad with another organic (clad) layer and then the clad filament is drawn to form a further fine fiber, but the obtained fiber is expensive.

The present inventors were aware of experiments carried out to obtain composite organic fibers having an improved strength and electrical conductivity by using fine and short inorganic fibers as a filler mixed with an organic material, and that as a result, the VGCF's have a much higher electrical conductivity than that of carbon black, have good drape to generalpurpose resin, and do not decrease a flowability of a resin containing the VGCF's, during injection molding, and it was found that the resin containing the VGCF's can be easily spun to form fibers.

The present applicant filed Japanese Patent Application No. 62-275508 on Oct. 30, 1987 (corresponding to U.S. Pat. Ser. No. 264109 filed on Oct. 28, 1988), proposing composite organic fibers based on the above finding, having a high strength, a superior electrical conductivity, and inexpensive.

The proposed composite organic fibers have a relatively long fiber length, and thus problems must be taken into consideration, such as breaking, which complicates the spinning process. To obtain staple fibers from the proposed fibers, the fibers must be chopped, and therefore, the production of staple fibers becomes very complicated.

SUMMARY OF THE INVENTION

An object of the present invention is to provide a method of easily and simply producing composite staple organic fibers having superior properties such as strength and electrical conductivity, at a reduced production cost.

The above-mentioned and other objects of the present invention are attained by providing a method of producing composite staple fibers essentially consisting of resin matrix and fine and short inorganic reinforcing fibers, comprising the steps of: blending, heating and mixing a resin material and fine and short inorganic reinforcing fibers having a fiber diameter of 1 $\mu m$ or less to prepare a molten polymer containing the dispersed reinforcing fibers; spouting the molten polymer from small apertures formed in a high speed rotator to form filaments; and blowing hot gas onto the spouted filaments to form the composite staple fibers.

The following steps can be adopted, instead of the above-mentioned spouting step and hot gas blowing step, of spinning the molten polymer from spinning apertures into filaments; and simultaneously blowing hot gas onto the filaments at a high flow velocity from gas discharging holes arranged near the spinning apertures, to draw and cut the filaments into staple fibers.

According to the present invention, fine and short inorganic reinforcing fibers which have been newly provided are dispersed in a resin matrix and the resin is formed into hitherto unobtainable composite staple fibers having a very small fiber diameter.

BRIEF DESCRIPTION OF THE DRAWINGS

The present invention will be more apparent from the description of the preferred embodiments set forth

DESCRIPTION OF THE PREFERRED EMBODIMENT

Figure 1:
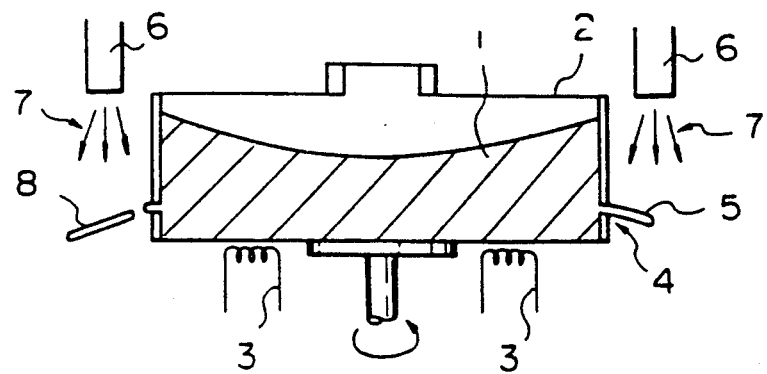
FIG. 1 is a schematic view of a centrifugal spinning apparatus for producing staple fibers.

According to the present invention, preferably a molten polymer is prepared in a manner similar to that disclosed in Japanese Patent Application No. 62-275508. For example, resin particles and fine and short inorganic fibers are blended (mixed) in a mixer (e.g., a Henschel mixer), so that the inorganic fibers are adhered to the surfaces of the resin particles, and some of the resin particles are fused together to form one body. This blending (mixing) is disclosed in, e.g., Japanese Patent Application No. 62-81169 or U.S. Ser. No. 243959 filed on Sep. 14, 1988. The obtained particles are then charged into an extruder in which the particles are heated and mixed to form a molten polymer. The molten polymer can be directly spun through spinning heads of the extruder. On the other hand, it is possible to form a spinning raw material by cooling the molten polymer in an outlet portion of the extruder and cutting the extruded product into pellets. The pellets are charged into a melting portion of a centrifugal spinning apparatus or another extruder with the spinning head, are melted and are kept in a molten state in a spinning portion thereof by a suitable heater.

In the present invention, preferably conventional synthetic resins are used as the organic resin, for example, polyamides, such as nylon 6, nylon 11, nylon 66 and nylon 612; polyesters, such as polyethylene-terephthalate and polybutylene-terephthalate; polycarbonates, such as poly-bis-phenol A and carbonate; polyamideimide; polyphenylene-sulfide; polyphenylene oxide; polysulfone; polyolefin; styrene resin; acryl resin; polyvinyl-chloride; polyvinylidene-chloride; and, polyvinyl-alcohol; or the like.

Also, preferably the fine and short inorganic reinforcing fibers are VGCF's and/or potassium titanate whiskers.

Preferably, the VGCF's have a diameter of from 0.1 to 1.0 $\mu$m and a length of from 3 to 500 $\mu$m. The VGCF's may be further carbonized by a heat-treatment at a temperature of from 1300 to 3000° C. Where the diameter of the VGCF's is less than 0.1 $\mu$m, a strength thereof is low, and where the diameter is more than 1.0 $\mu$m, the production costs become high, and therefore, the diameter of the reinforcing fiber is restricted. A length of the VGCF's of less than 3 $\mu$m does not remarkably improve the tensile strength of the composite filament, and a length of more than 500 $\mu$m increases the production costs.

Note, when potassium titanate whiskers are used to form the composite filaments, the strength and slidability (frictional characteristics) of the filaments are improved, and it is possible to use the VGCF's and the potassium titanate whiskers in a combination thereof.

Preferably, 2 to 70 wt% (particularly, 10 to 50 wt%) of the fine and short inorganic reinforcing fibers are blended (mixed) with the organic resin, and the mixture is formed into staple reinforced fibers by a suitable spinning method, depending on the resin used. Where the content of the inorganic fibers is less than 2 wt%, the properties of the composite fibers are not improved, and where the content is more than 70 wt%, spinning becomes difficult. Of course, the inorganic fibers must be uniformly distributed throughout the composite staple fibers.

In the centrifugal spinning method, as shown in FIG. 1, the molten polymer 1 containing the uniformly dispersed inorganic fibers is fed in a high speed rotator 2, such as a cylindrical basket, provided with a heater 3 and small apertures 4 formed in a side wall of the rotator 2, and is spouted out of the small apertures 4 by centrifugal force as filaments 5. Nozzles 6 for a hot gas 7 are arranged near the rotator 2. During spinning, the hot gas is blown onto the spouted filaments 5 through the nozzles 6, to further draw the filaments 5, so that the filaments 5 are cut into staple fibers 8 having a desirable length by a synergistic action of the centrifugal force and the force of the blown hot gas.

Preferably, the rotator 2 is rotated at a peripheral speed at the apertures of from 50 to 250 m/s, and the hot gas 7 has a temperature of from 100 to 200° C. The hot gas 7 is composed of air or nitrogen. The hot gas can be blown onto the filaments through small apertures formed in the side wall of the rotator, by adopting a suitable blowing system, and thus a rotator diameter, a rotational speed, and the heating gas are regulated, to obtain the composite staple fibers having a desired length.

Figure 2:
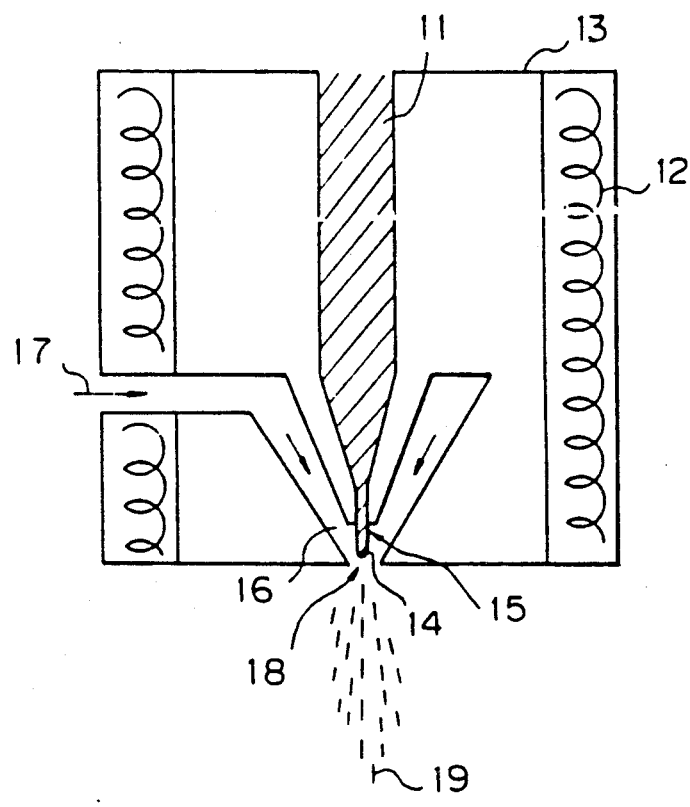
FIG. 2 is a schematic view of a melt spinning head for producing staple fibers.

In the melt-spinning method, as shown in FIG. 2, the molten polymer 11 containing the uniformly dispersed inorganic fibers is kept in a molten state by a suitable heater 12 within a spinning head 13, and is extruded into filaments 14 through spinning apertures 15 respectively. Gas discharging holes 16 are formed near the spinning apertures 15 in the spinning apparatus 13, respectively, and during spinning, a hot gas 17 is blown at a high flow velocity onto the extruded filaments 14 through the hole 16, to draw and cut the filaments 14 into staple fibers 19 at secondary spinning apertures 18, respectively. Preferably the hot gas 17 has a temperature higher than that of the hot gas used in the centrifugal spinning. For example, when polypropylene is used as the resin material, the hot gas has a temperature of from 200 to 400° C. The hot gas is composed of air or nitrogen. Preferably, the spinning apertures 15 have a diameter of 200 to 700 $\mu$m and the secondary spinning apertures 18 have a diameter of 600 to 2000 $\mu$m.

Preferably, the fiber diameter of the composite staple fibers is from 3 to 100 $\mu$m, more preferably 4 to 50 $\mu$m. When unwoven fabrics or felt are made of the composite staple fibers, the staple fibers have a fiber diameter of 3 $\mu$m or more. Note, composite staple fibers may be produced at the same time. Where the diameter of the staple fibers is more than 100 $\mu$m, the staple fibers are too inflexible to form good unwoven fabric or felt.

Preferably, the fiber length of the composite staple fibers is 300 mm or less. Where the fiber length is 300 mm or more, the processability of the staple fibers when forming the unwoven fabric or felt is lessened, or the staple fibers must be chopped, depending on the usage. The composite staple fibers produced in accordance with the present invention can be used in any manner which utilizes the improved thermal conductivity, frictional characteristics, and wear resistance obtained from these composite stable fibers.

The present invention will now be further explained by way of examples.

EXAMPLE 1

Resin particles of polypropylene [Sho-allomer MA510 (MFI=12 g/min), trade name of Showa Denko Kabushiki Kaisha] and VGCF's (vapor grown carbon fibers) heat-treated at 2300° C. and having a diameter of 0.1 to 0.4 $\mu$m and an average length of 30 $\mu$m, were used. 70 parts by weight of the resin particles and 30 parts by weight of the VGCF's were charged into a Henschel mixer having a internal volume of 20 $\mu$, and the agitating blades of the mixer were rotated at a peripheral speed of 40 m/sec to mix the VGCF's and resin particles, with the result that the VGCF's were adhered to surfaces of the resin particles. Some of the resin particles were fused together to form one body and included the VGCF's at the resin-particle interface. This mixing (blending) is disclosed in Japanese Patent Application No. 62-81169 or U.S. Ser. No. 243959. The obtained particles were then charged into a twin-screw extruder, and melted and mixed therein, to form an extruded product. The extruded product was cut into pellets to produce a raw material for a spinning.

The obtained pellets were charged in a centrifugal spinning apparatus, were melted in a melting portion of the apparatus, and fed into a rotator having a heater. The rotator was a cylinder having a diameter of 200 mm, a depth of 25 mm, and 30 apertures having a diameter of 0.5 mm formed in a side wall thereof. The rotator was maintained at a temperature of 250° C. and rotated at 2000 rpm to perform the centrifugal spinning.

During the spinning, a nitrogen hot gas at 150° C. was blown at 150 m/sec onto filaments spouted out of the apertures by centrifugal force from above nozzles, at a right angle to the filaments, to produce composite staple organic fibers reinforced with fine and short inorganic fibers.

The produced staple fibers had an average diameter of 20 $\mu$m, a draw ratio of 25, an average length of 50 mm, a tensile strength (Ts) of 900 kg/cm$^2$, and a specific resistance ($\rho$) of 20 $\Omega$cm.

EXAMPLE 2

50 parts by weight of the resin (polypropylene) particles and 50 parts by weight of the VGCF's used in Example 1 were blended, heated, mixed, melted, and centrifugally spun into composite staple organic fibers under the same conditions as those of Example 1. The produced staple fibers had an average diameter of 17 $\mu$m, a draw ratio of 29, an average length of 30 mm, a tensile strength (Ts) of 1000 kg/cm$^2$, and a specific resistance ($\rho$) of 3 $\Omega$cm. Namely, the increased content of VGCF's brought a remarkable improvement of the electrical conductivity, and an increased strength.

EXAMPLE 3

70 parts by weight of the resin (polypropylene) particles and 15 parts by weight of the VGCF's used in Example 1, and 15 parts by weight of potassium titanate whiskers having an average diameter of 0.3 $\mu$m were blended, heated, mixed, melted, and centrifugally spun into composite staple organic fibers under the same conditions as those of Example 1. The produced staple fibers had an average diameter of 25 $\mu$m, a draw ratio of 20, an average length of 30 mm, a tensile strength (Ts) of 1300 kg/cm$^2$, and a specific resistance ($\rho$) of 100 $\Omega$cm. Namely, the increased content of VGCF's brought a remarkable improvement of the electrical conductivity, and an increased strength. The addition of potassium titanate whiskers further increased the strength.

EXAMPLE 4

The pellets prepared in Example 1 were charged into an extruder provided with a spinning head 13 shown in FIG. 2, at the outlet portion thereof, melted and extruded into a 50 g/min filament through a spinning aperture 15 having a diameter of 300 $\mu$m. The spinning head was heated at 320° C. A hot compressed air 17 (370° C., 3 kg/cm$^2$ at a room temperature) was blown onto the extruded filament through a discharging hole 16 arranged near to and surrounding the spinning aperture 15, to draw and cut the filament into staple fibers 19 at a secondary spinning aperture 18. The produced staple fibers were received by a stainless net tray placed under the spinning head. To cool the hot compressed air, air at a room temperature was blown between the secondary spinning aperture and the tray.

The collected staple fibers had an average diameter of 30 $\mu$m, an average length of 35 mm, a tensile strength (Ts) of 950 kg/cm$^2$, and a specific resistance ($\rho$) of 8 $\Omega$cm.

As mentioned above, since the composite staple organic fibers were made of a conventional resin, inexpensive VGCF's, and/or potassium titanate whiskers, and produced by using a centrifugal spinning method or a melt-spinning method without a chopping step, the obtained staple fibers were cheaply produced, have an improved strength and electrical conductivity, and offer a desired fiber diameter and length. The composite staple fibers can be used in various applications, e.g., as a reinforcement material per se, for an unwoven fabric or felt.

It will be obvious that the present invention is not restricted to the above-mentioned embodiments and that many variations are possible for persons skilled in the art without departing from the scope of the invention.

We claim:

1. A method of producing composite staple fibers having a fiber length of 300 mm or less and a fiber diameter of 100 $\mu$m or less, said composite staple fibers consisting essentially of resin matrix and 2 to 70 wt. % fine and short inorganic reinforcing fibers, said method comprising the steps of:

blending, heating, and mixing a resin material and fine and short inorganic reinforcing fibers having a fiber diameter of 1 $\mu$m or less to prepare a molten polymer containing the dispersed reinforcing fibers;

spouting said molten polymer out of small apertures formed in a high speed rotator to form filaments; and blowing hot gas onto the spouted filaments to form said composite staple fibers;

wherein said fine and short inorganic reinforcing fibers are carbon fibers produced by a vapor phase growth method, said carbon fibers having a fiber diameter of from 0.1 to 1.0 $\mu$m and a fiber length of 3 to 500 $\mu$m.

2. A method according to claim 1, wherein said carbon fibers are heat-treated at a temperature of from 1300 to 3000° C.

3. A method according to claim 1, wherein said rotator is rotated at a peripheral speed at the apertures of from 50 to 250 m/s.

4. A method according to claim 1, wherein said hot gas has a temperature of from 100 to 200° C.

5. A method of producing composite staple fibers consisting essentially of resin matrix and fine and short inorganic reinforcing fibers comprising the steps of:

blending, heating and mixing a resin material and fine and short inorganic reinforcing fibers having a fiber diameter of 1 μm or less to prepare a molten polymer containing the dispersed reinforcing fibers;

spinning said molten polymer from spinning apertures into filaments; and simultaneously blowing hot gas onto the filaments at a high velocity from gas discharging holes arranged near the spinning apertures, to draw and cut the filaments into said staple fibers wherein said staple fibers have a fiber length of 300 mm or less and a fiber diameter of from 3 to 100 μm; and the content of said fine and short inorganic reinforcing fibers is 2 to 70 wt.%; and wherein said fine and short inorganic reinforcing fibers are carbon fibers produced by a vapor phase growth method, said carbon fibers having a fiber diameter of from 0.1 to 1.0 μm and a fiber length of from 3 to 500 μm.

6. A method according to claim 5, wherein said carbon fibers are heat-treated at a temperature of from 1300 to 3000° C.

7. A method according to claim 5, wherein said hot gas has a temperature of from 200 to 400° C.

* * * * *